(12) United States Patent
Miyabukuro

(10) Patent No.: US 6,382,805 B1
(45) Date of Patent: May 7, 2002

(54) EXTERNAL REARVIEW MIRROR

(75) Inventor: Pedro Takashi Miyabukuro, Santo André (BR)

(73) Assignee: Metagal Industria e Comercio LTDA, Sao Paulo (BR)

( * ) Notice: Subject to any disclaimer, the term of this patent is extended or adjusted under 35 U.S.C. 154(b) by 0 days.

(21) Appl. No.: 09/795,734

(22) Filed: Feb. 28, 2001

(51) Int. Cl.[7] .............................................. G02B 7/182
(52) U.S. Cl. ...................... 359/872; 359/841; 248/476; 248/479
(58) Field of Search ................................. 359/871, 872, 359/841, 876, 877, 881; 248/476, 479, 485, 487, 549

(56) References Cited

U.S. PATENT DOCUMENTS 5,332,186 A * 7/1994 Lutz ........................... 248/549
5,946,151 A * 8/1999 Levko ......................... 359/872
6,109,586 A * 8/2000 Hoek .......................... 248/476

* cited by examiner

Primary Examiner—Mark A. Robinson
(74) Attorney, Agent, or Firm—Micahel J. Striker

(57) ABSTRACT

An external rearview mirror has a mirror plate, a device for regulating a position of the mirror plate and including an activator, a support structure for supporting the activator, a housing accommodating the mirror plate, the activator and the support structure, a vertical pivot point located inside the housing, a device for stabilization of mirror positions incorporated in the support structure and assembled in an articulated way around the post, a base placable on a side of a vehicle and having a protuberance in which the post is supported, and a reinforcing structure located in the base, the support structure, the post and the reinforcing structure being composed of a plastic material which is similar to a plastic material for other components wherein a main part, a fitting part, receptors of screws, a lateral part in form of a sleeve and its indented side, are all composed of a plastic material and together form a single integral element.

3 Claims, 2 Drawing Sheets

EXTERNAL REARVIEW MIRROR

BACKGROUND OF THE INVENTION

The present invention relates generally to external rearview mirrors as accessories of automotive vehicles.

Known external rearview mirrors usually include a set of a mirror plate, a mechanical or electrical device for regulating the position of the mirror plate which includes an activator fixed to the mirror plate, transmission cables or an electrical cable extending from the activator, and levers or an actuating button located in the interior of the vehicle and connected to the cable. The mirror usually includes a support structure fixed to the actuator of the mirror plate, a housing with an opening directed to a region behind the vehicle and accommodating the mirror plate, the mirror plate activator and the support structure. The housing is fixed to the support structure. A vertical pivot point is partially located in the housing. A stabilization device for the mirror position is incorporated in the support structure and assembled in an articulated way around the post. A base is fixed to the side of the vehicle and has a protuberance, in which the inner end of the post is fixed. A reinforcement structure is provided in the base.

In conventional constructions of this type, a number of the components is formed of an adequate plastic. Some components are composed of metal alloys such as the support structure for fixing the activator of the mirror plate, the housing and a part of the stabilization device, the vertical post of the base which forms a part of the stabilization device, and the reinforcement structure of the base. This complicates the production process of the mirror since it is necessary to handle two different materials in the production line and provide correspondingly two types of equipment for the corresponding processes and/or to have two types of supplies. This complicates the production process and makes it more difficult. Another disadvantages is that the components of different materials must be assembled with one another, which also complicates the manufacturing line.

Also, when the mirror includes the parts of different materials fixed to one another generally by screws, more defects can occur due to the production process and/or from vibration during the use and/or the differences in the fatigue places of the materials and/or the differences in the material under the actions of conditions of use, environment and/or others.

SUMMARY OF THE INVENTION

Accordingly, it is an object of the present invention to provide an external rearview mirror which avoids the disadvantages of the prior art.

In keeping with these objects and with others which will become apparent hereinafter, one feature of present invention resides, briefly stated, in an external rearview mirror in which the support structure, the post and the reinforcement structure are composed of a plastic material similar to the plastic material of other components, the support structure has a main part with a fitting part of a fitting device for fixing of the support structure and a housing to one another, the main part is provided with towers and/or eyelets and/or similar receptors of screws for fixation of the activator of the regulating device to the support structure, the main part also has a window for passage of the cables of the regulation device, the support structure has a lateral part formed as a sleeve and forming a part of the stabilization device articulated around the post with an inferior end having an indented structure, the main part, its feeding parts and its towers and/or eyelets and/or similar receptors and the lateral part in form of the sleeve and its indented side are formed of a plastic material and in a sole part.

When the external rearview mirror is designed in accordance with the present invention, it eliminates the disadvantages of the prior art and provides for the highly advantageous results.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
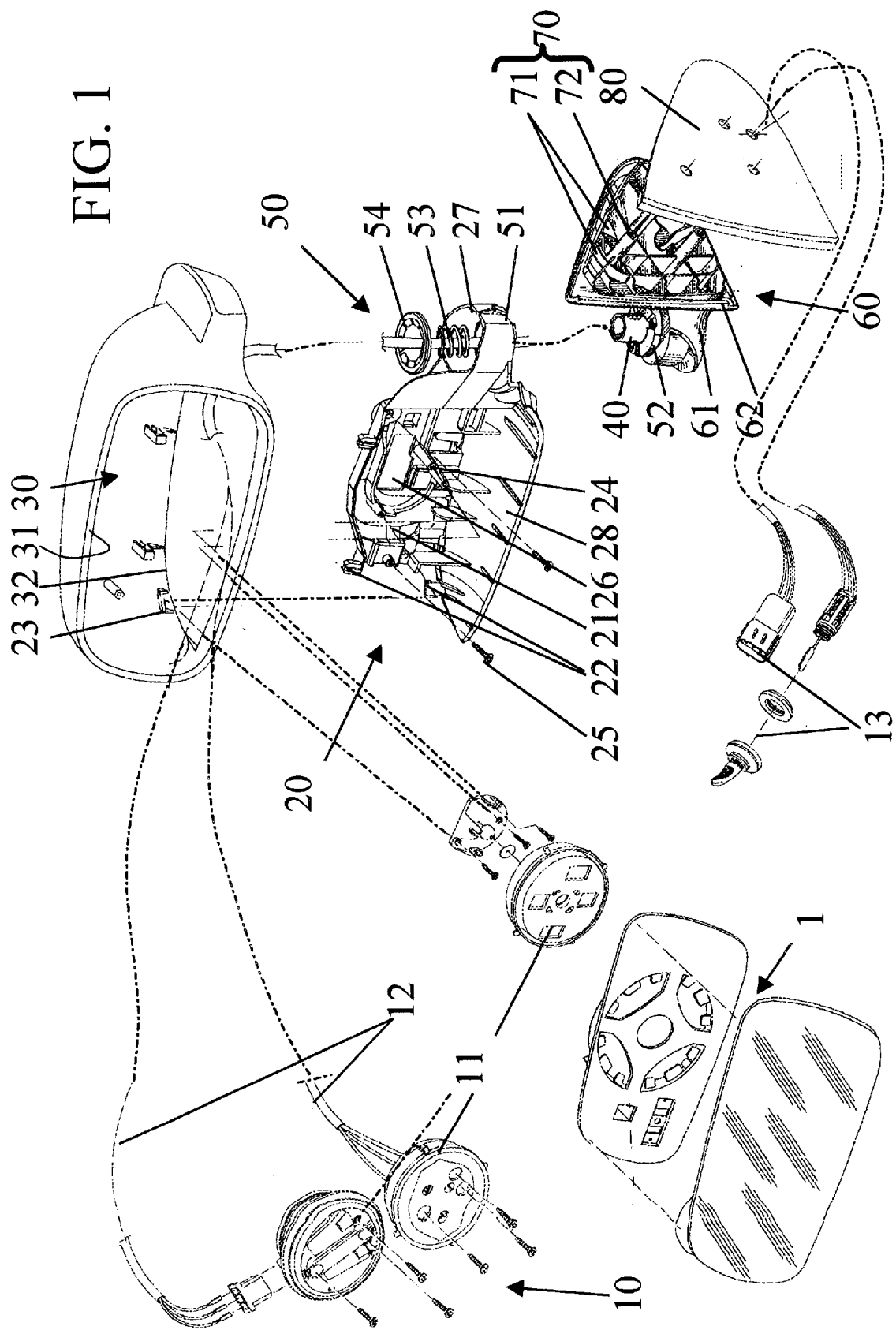
FIG. 1 is a view showing an external rearview mirror in accordance with the present invention on an exploded view.
Figure 2:
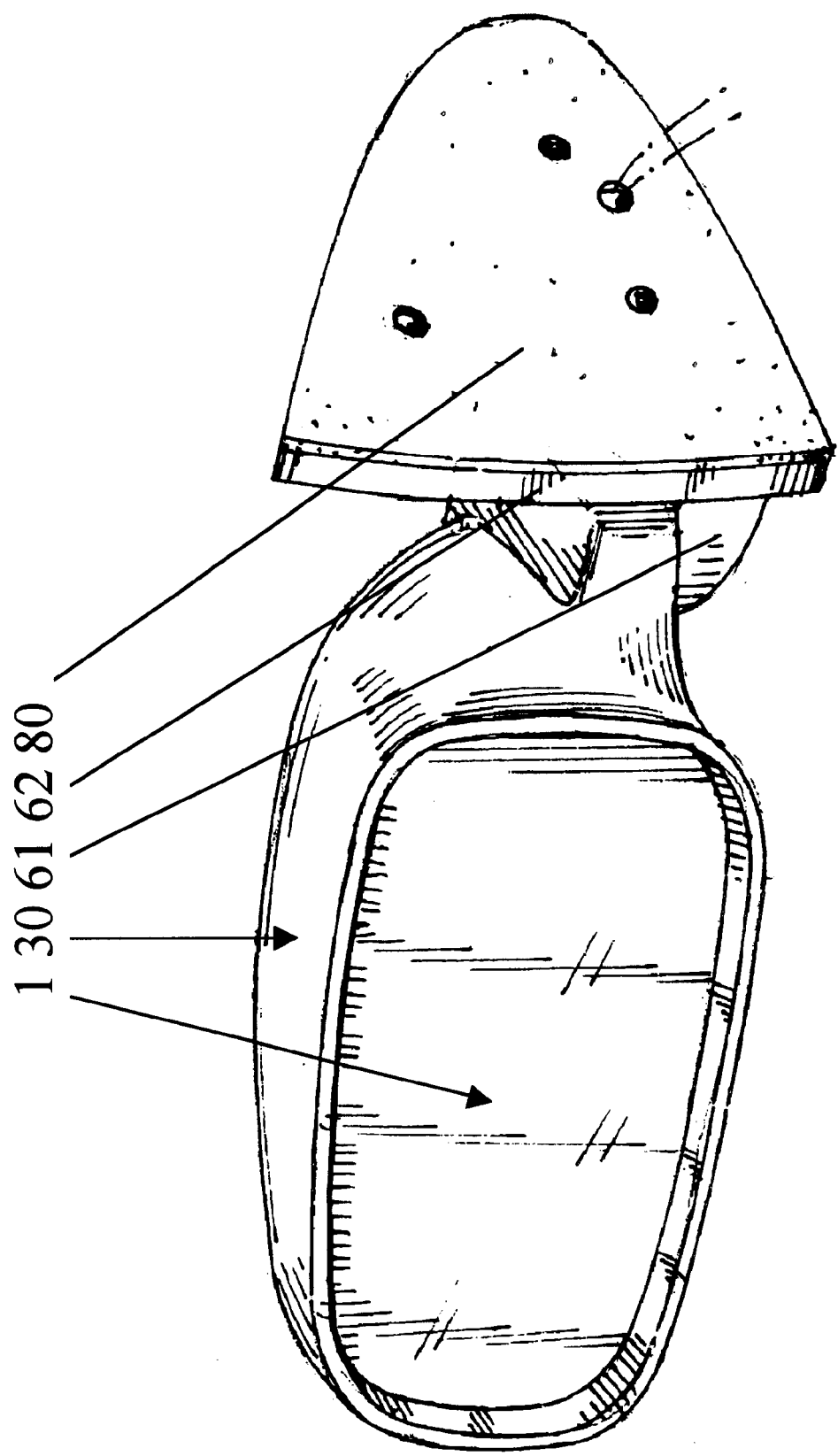
FIG. 2 is a view showing the external rearview mirror in accordance with the present invention in an assembled condition.

An external rearview mirror in accordance with the present invention has a mirror plate set identified with reference numeral 1, a mechanical or electrical device 10, a regulating device including an actuator 11 in which a posterior face of the mirror plate is fixed, a transmission or electric cables 12 extended from the actuator, and actuating levers or buttons 13 mounted in the interior of the vehicle and connected to the cables.

The mirror also includes a support structure 20 in which an actuator of the mirror plate is fixed, a housing 30 provided with an opening 31 directed to the region behind the vehicle and supporting the mirror plate, the mirror plate activator and the support structure and fixed in the support structure 20. It includes a pivot vertical post 40 partially located inside the housing, and a stabilization device 50 for stabilizing the mirror position and incorporated in the support structure and assembled in an articulated way around the post. The mirror further has a base 60 fixed on the side of the vehicle and having a protuberance 61 in which the post is located, a reinforcement structure 70 provided in the base, and a blanket 80 located between the base 60 and the vehicle body.

The inventive external rearview mirror is designed so as to provide the smallest possible variation of materials and the smallest possible need for parts to be assembled with one another by screws and the like. Therefore the support structure 20, the post 40 and the reinforcement structure 70, instead of being composed of metal alloy as in conventional rearview mirrors, are composed of a plastic material similar to the plastic material used for other components of the mirror such as the structure of the actuator 11, the housing 30, the base 60 and others.

The support structure 20 has a main part 21 provided with a fitting part or part 22 to be connected with other fitting part or parts 23 provided in the housing 30. The fitting parts 22 and 23 fix the support structure 20 and the housing 30 with one another. The main part 21 has also towers and/or eyelets and/or similar receptors 24 for screws 25 which fix the activator of the mechanical or electrical regulating device 10 to the support 20. The main part 21 also has a window 26 for passage of the cables 12 of the mechanical or electrical regulating device 10. The support structure 20 also has a lateral part formed as a sleeve 27 which is a part of the stabilization device 50 articulated around the post 40. Its inferior end has an indented surface 51. The main part 21, its fitting part 22, and its towers and/or eyelets and/or similar elements 24, the lateral part formed as the sleeve 27 with its indented side 51, are composed of a plastic material and formed as a one-piece integral part.

The base 60 includes a part formed as a plate 62, a protuberance 61 provided in the anterior side of the plate 62, the post 40 incorporated in the protuberance 61 and having an indented surface 52 cooperating with the indented surface 51 of the support structure 20. The base also has a reinforcement 70 provided on the posterior face of the plate 62 and formed by reinforcement ribs 71. Receptor towers 72 are provided for fixation screws, for fixing the base to the side of the vehicle. All these parts are composed of a plastic material and together form a single integral part.

Therefore the external rearview mirror which is designed as explained herein above, has all main components composed of a plastic material. This reduces the variation of the materials for its manufacture and mounting and simplifies the production process.

The support structure 20 may incorporate in its inferior side a part in form of the plate 28 which belongs to the inferior wall of the housing 30 and is provided with a corresponding inferior opening 32. The support structure 20 can be introduced in the opening 32 and closed by the part which is formed as a plate 28.

The stabilization device 50 can have the sleeve 27 with an indented surface 51, the post located next and around the inferior end and provided with the indented surface 52 cooperating with the indented surface 51, a spring which axially compresses the set so as to unite the indented surfaces 51, 52, and a washer 54 which maintains the set assembled and supports one end of the spring 53. The stabilization device 50 may have other similar constructions.

The external rearview mirror of the present invention can have other ornamental configurations and can be provided with various functional sets, such as the mirror plate set 1, the activator set 10 and others with other solutions which are not shown here.

It will be understood that each of the elements described above, or two or more together, may also find a useful application in other types of constructions differing from the types described above.

While the invention has been illustrated and described as embodied in external rearview mirror, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. An external rearview mirror, comprising a mirror plate; a device for regulating a position of said mirror plate and including an activator; a support structure for supporting said activator; a housing accommodating said mirror plate, said activator and said support structure; a vertical pivot post located inside said housing; a device for stabilization of mirror positions incorporated in said support structure and assembled in an articulated way around said post; a base placeable on a side of a vehicle and having a protuberance in which said post is supported, and a reinforcing structure located in said base, said support structure, said post and said reinforcing structure being composed of a plastic material which is similar to a plastic material of other components; fitting means provided on a main part of said support structure and on said housing for fitting said support structure with said housing, said main part being provided with receptors for fixing elements for fixation of said activator of said regulating device to said support structure, said main part also having a window for passing of cables of said regulation device, said support structure also having a lateral part formed as a sleeve which is a part of said stabilization device articulated around said post and having an indented surface; said main part, said fitting part, said receptors of fixing elements, said lateral part in the form of said sleeve and its indented side, are all composed of a plastic material and together form a single integral element.

2. An external rearview mirror as defined in claim 1, wherein said base includes a plate provided with said protuberance, said post having an indented surface cooperating with said indented surface of said support structure, said base also having a reinforcing surface provided in a posterior face of said plate and formed by reinforcement ribs and receptor towers for further fixing elements, said base with said plate, said protuberance, said post, and said reinforcing structure with said reinforcing ribs and said receptor towers being composed of a plastic material and together form a one-piece integral part.

3. An external rearview mirror as defined in claim 1, wherein said support structure in its inferior side is provided with a plastic part formed as a plate which belongs to an inferior wall of said housing, said housing having an opening through which said support structure is introduced and which is closed by said plate.

* * * * *